United States Patent [19]

Westermann

[11] 3,969,326

[45] July 13, 1976

[54] CARBOXYL TERMINATED POLYCHLOROPRENES AND COMPOSITIONS CONTAINING THEM

[75] Inventor: Peter Henry Westermann, Dorking, England

[73] Assignee: BP Chemicals International Limited, London, England

[22] Filed: Sept. 12, 1974

[21] Appl. No.: 505,461

[30] Foreign Application Priority Data
Sept. 28, 1973 United Kingdom............ 45436/73
Jan. 16, 1974 United Kingdom.............. 1949/74

[52] U.S. Cl............................ 526/11.1; 260/27 BB; 260/533 N; 526/11.2; 526/89; 526/227
[51] Int. Cl.².................... C08F 4/32; C08F 36/18
[58] Field of Search......... 260/92.3, 78.4 R, 78.4 D, 260/27 BB, 533 N

[56] References Cited
UNITED STATES PATENTS 3,049,523   4/1962   Roussel............................. 260/92.3
3,198,760   8/1965   Widenor............................... 260/27
3,293,289   12/1966  Butler et al........................ 260/533

FOREIGN PATENTS OR APPLICATIONS 811,725   4/1959   United Kingdom
957,652   5/1964   United Kingdom Primary Examiner—John Kight, III
Attorney, Agent, or Firm—Brooks Haidt Haffner & Delahunty

[57] ABSTRACT

Carboxyl terminated polychloroprene is produced by polymerizing chloroprene in the presence of a peroxide initiator having two carboxyl groups. The chloroprene is brought into contact initially with all the peroxide initiator employed. Compositions containing the carboxyl terminated polychloroprene are also disclosed.

23 Claims, No Drawings

CARBOXYL TERMINATED POLYCHLOROPRENES AND COMPOSITIONS CONTAINING THEM

The present invention relates to curable chloroprene polymers, to compositions containing them, and to cured articles made from the compositions.

It is possible to make polychloroprene which retains the rubbery characteristics generally associated with chloroprene polymers for example a reasonably good elongation at break but which has a good tensile strength. When such polymers are produced by the usual methods of making chloroprene polymers they have high molecular weights and are difficult to process. For some purposes it would be desirable to have a chloroprene polymer of lower molecular weights such that it is fluid or can be made fluid without excessive heating so that it may be poured into moulds or injected under low pressure, and which can however be cured in the mould to give a strong tough product.

British Patent Specification No. 957,652 describes a method of making liquid or easily melted carboxy terminated polymer which comprises polymerising butadiene or isoprene or mixtures thereof with up to 35 per cent by weight of styrene and/or acrylonitrile, by adding azo or peroxide initiator having carboxyl terminals to said monomer in a variable non-linear fashion. This is done to obtain a polymer of enhanced suitability for the production of curable fluid rubbers.

Products produced according to British Patent Specification No. 957,652 have many useful properties but for some purposes their rates of cure are too slow and moulding compositions formed from them tend to stick to mould surfaces. Moreover, their miscibility with some epoxy resins with which they can be cured is limited at room temperature and thus it is often necessary to use elevated temperature in the production of "homogeneous" moulding compositions containing these carboxyl terminated polymers and the epoxy resins.

It is known from British Patent Specification No. 811,725 to make dicarboxy chloroprene polymers by polymerising chloroprene by heating a mixture of chloroprene with a carboxyl-substituted azo initiator. In contrast to the azo initiators used in GB No. 811,725 acyl peroxides, such as the dicarboxylic acid peroxides exemplified in GB No. 957,652, are known to undergo free radical induced decomposition. In other words with high levels of peroxide in the polymerisation the formation of the free radicals which initiate the polymerisation becomes strongly autocatalytic. The man skilled in the art would expect that the polymerisation of chloroprene in the presence of large quantities of acyl peroxides would be difficult to control, particularly as chloroprene is known to be a particularly reactive monomer, more reactive for example than the butadiene or isoprene used in GB No. 957,652. In view of these difficulties and the clear instruction in GB No. 957,652 to use gradual addition of the initiator to obtain a product suitable for use as a fluid rubber the man skilled in the art would be led to avoid making carboxyl terminated polychloroprene by using a dicarboxylic acid peroxide, and adding substantially all the peroxide initially.

It has now surprisingly been found that by carrying out the polymerisation chloroprene by adding substantially all of the peroxide initiator initially the carboxyl terminated products obtained have higher functionality, i.e. a greater number of carboxyl groups, and a lower molecular weight (both desirable for liquid rubbers) than when the initiator is fed to the polymerisation reaction over a long period of time as in GB No. 957,652.

Accordingly the present invention provides a process for the production of carboxyl terminated polychloroprene which comprises polymerising chloroprene in the presence of a peroxide initiator having two carboxyl terminal groups the chloroprene being brought into contact initially with substantially all the peroxide initiator employed.

The present invention also provides a carboxyl terminated polymer made by polymerising chloroprene in the presence of a peroxide initiator having two carboxyl terminal groups, the chloroprene being brought into contact initially with substantially all the initiator employed.

The invention provides a curable composition comprising a carboxyl terminated polychloroprene as set out in the preceding paragraph, and a curing agent reactive with the carboxyl group.

The invention further provides a moulded article made by curing a composition as set out in the preceding paragraph.

The chloroprene can be homopolymerised or copolymerised with up to 20% by weight of a copolymerisable monomer or monomers to give products according to the present invention. Many monomers are known to be capable of copolymerisation with chloroprene and examples are butadiene, styrene, acrylonitrile and 2,3-dichloro-1,3-butadiene. Copolymerisation with not more than 5% and suitably between 1 and 2% by weight butadiene is particularly preferred to give products having good stabilities.

The polymerisation is suitably carried out under homogeneous reaction conditions and preferably in the presence of a solvent for the various ingredients employed. Suitable solvents are cyclic ethers e.g. tetrahydrofuran, dioxane and ketones e.g. methyl ethyl ketone and acetone, and mixtures thereof, e.g. mixtures of acetone and hexane. The use of acetone is preferred. The solvent used must be inert under the reaction conditions. Solvents such as alcohols which react with the carboxyl group in the peroxide initiator must be avoided.

The quantity of solvent employed can be varied considerably bearing in mind its function to maintain a homogeneous reaction mixture by acting as a mutual solvent for the various components of the mixture. Dilution of chloroprene with several times its weight of solvent for example 1.2 to 15 times its own weight of solvent, has a number of advantages. It reduces the rate of polymerisation and allows good heat transfer, it gives a product of high functionality and it gives a desirably low molecular weight product for a given ratio of initiator to monomer.

The temperature at which the polymerisation is brought about depends on the initiator used and to some extent on any solvent employed. For example, with solvents such as tetrahydrofuran there is a tendency for the products to contain hydroxyl groups as well as carboxyl groups as the temperature is increased. Thus, if this tendency is to be avoided lower reaction temperatures are employed. Generally the reaction temperature lies in the range 70° to 150°C and preferably in the range 80° to 120°C.

Suitable peroxide initiators having carboxyl terminal groups are those dicarboxylic acids which form internal (ring) anhydrides, from which the peroxides are most easily prepared. Use of these initiators leads to the formation of polymer products having substantially 100 per cent carboxy terminals. The preferred initiators are glutaric acid peroxide, succinic acid peroxide, and alkyl-substituted glutaric and succinic acid peroxides such as, for example, methyl glutaric acid peroxide. These materials can be prepared by the method reported by Clover and Houghton, Amer. Chem. J. 32,43 – 77 (1904), for example.

The dicarboxylic acid peroxides are most conveniently prepared by reaction of the corresponding dicarboxylic acid anhydrides with hydrogen peroxide. The reaction suitably takes place at a temperature below about 30°C., preferably about 10–20°C. in a period of two hours or less. The concentration of hydrogen peroxide in the reaction mixture is preferably at least 10 per cent or higher, but the concentration of excess hydrogen peroxide is best kept less than about 25 per cent of that required by stoichiometry.

The polymerisation of chloroprene to give products according to the present invention is rapid, reaction times being typically 1–2 hours. Conversion can consequently be much higher for chloroprene than butadiene at similar reaction times. Final conversions for chloroprene polymerisations are suitably in the range 50 to 85%.

The chloroprene is brought into contact initially with substantially all of the initiator initially employed. It may not be possible to bring all the components of the reaction mixture into contact simultaneously. Thus in a batch reaction it may be preferred to add chloroprene to preheated initiator dissolved in solvent and it may not be possible to introduce all the chloroprene into the reactor at once because of limitations such as the size of any pipes through which the chloroprene is introduced. However contact is considered to take place 'initially' if it takes place over a short time at the beginning of the reaction, preferably a time which is not more than 5% of the total polymerisation reaction time.

The number average molecular weights of the products made in this way decrease slightly with increasing conversion. It should be noted that the behaviour of chloroprene is quite different from that of butadiene or isoprene which show a sharp increase of molecular weight with increasing conversion when polymerised in this manner.

The constitution and/or the molecular weight of the final polymer produced in a specific case may also be controlled by, inter alia, varying the polymerisation temperature and varying the concentration of the peroxide initiator in a known manner. The chloroprene polymers are fluid rubbers, i.e. they have a molecular weight below about 10,000.

The chloroprene polymers of the present invention may be stabilised by the addition of rosins and/or rosin acids, e.g. wood rosin and rosin acid dimers. Particularly preferred is "Dymerex", a commercially available product of which consists of approximately 80% rosin acid dimers and 20% monomeric rosin acids and neutral material. Dimer acids are preferred because monomeric rosin acids act as chain stoppers to the chain extension reaction which occurs when carboxyl terminated polychloroprenes are reacted with diepoxides. These may be added to the reaction mixture before, during or after the polymerisation process. Other stabilisers such as dithiocarbamates, tertiary butyl catechol, butylated hydroxy toluene and triethylamine may be added after polymerisation.

The reactor may be of any convenient type, but is preferably a tubular reactor, or a vessel type reactor with or without an agitator. The polymerisation may be carried out in batches, continuously or intermittently.

In the continuous process the reactants may be fed into the reactor at a constant rate and the polymer product may be removed continuously so that the volume within the reactor remains constant and a constant polymerisation state is reached.

Although in the course of a continuous polymerisation in a vessel type reactor it will be necessary to feed initiator to the reaction to maintain the amount of initiator in the reaction at the desired level, the chloroprene fed to the reaction is immediately mixed with the total quantity of initiator in the reactor and is not exposed to gradually increasing amount of initiator as in the process of GB No. 957,652.

The chloroprene polymers of the present invention may be isolated by precipitation from cold methanol or ethanol followed by drying under vacuum. Preferably they can be isolated by stripping off the unreacted solvent under vacuum, washed with water to remove initiator residues and dried under vacuum.

The carboxyl teminated polymers of the invention are suitably cured with agents reactive with the carboxyl group, such as polyepoxides, polyisocyanates, polyimines, polyamines, polyhydroxyls and metal oxides. Particularly good results have been obtained using diepoxy resins such as the diglycidyl ether of bisphenol A with 2,4,6-tri(dimethylaminomethyl) phenol as co-curing agent. Low temperature cures can be obtained by using diisopropylsalicylato-chromium (III) as catalyst for the reaction of diepoxides with carboxyl terminated polymers. The reaction can be carried out in low pressure moulds or in open moulds to give case products.

The diepoxy compounds may be used in the presence of a co-curing agent. This co-curing agent appears to be desirable to promote a good degree of reaction between the carboxyl terminated polymer and diepoxy resin.

It has now been found that in a curable polychloroprene composition which comprises a carboxyl terminated polychloroprene, a compound having at least two epoxy groups, a tertiary amine epoxy-curing agent, and a primary or secondary amine or a miscible dicarboxylic acid or anhydride, the presence of the primary or secondary amine or a miscible dicarboxylic acid or anhydride is beneficial. Thus the present invention also provides a cured article which may be made by heating a mixture of a carboxyl terinated polychloroprene, a compound having at least two epoxy groups, a tertiary amine epoxy-curing agent, and a co-curing agent which is a primary or secondary amine or a miscible dicarboxylic acid or anhydride.

The functionalitity of the carboxyl groups per molecule, is preferably in the range 1.5 to 2.5.

The epoxy compound is preferably a di-functional compound though mixtures of mono-, di-, tri or higher epoxy compounds may be used. Various epoxides are known which may be cross-linked to give resins and any of these may be used in a composition of the present invention. It is preferred however to use the diglycidyl ether of bisphenol A.

The tertiary amine epoxy-curing agent may be of any of the teritary amine curing agents known for use in the curing for epoxy compounds alone. The curing agent may be for example diethyl aniline, pyridine or 2-vinyl pyridine. It is preferred to use 2,4,6-tri(dimethylaminomethyl) phenol.

The additional curing agent may be a mono-amine or may contain more than one amine group such as a diamine. One example of a diamine is hexamethylene diamine. It is preferred however to use a secondary amine as the presence of a primary amine may give excess cross-linking. An example of a suitable mono-amine is di-n-butylamine. It is preferred to use a secondary diamine, more preferably an aromatic secondary diamine for example N,N-di-sec-butyl-p-phenylene diamine. It is desirable to avoid the use of amines having a low boiling point so as to reduce the possibility of the amine being lost from the composition either during mixing of the components of the curable composition together or in the subsequent curing stage.

The miscible di-carboxylic acid or anhydride is an acid or anhydride which is liquid at the temperature at which the components of the curable composition are mixed together or is soluble in the mixture at the mixing temperature. Thus it is preferred to use acid anhydrides having melting points below 100°C. Examples of suitable anhydrides are glutaric anhydride (melting point 65°C) and maleic anhydride (melting point 53°C).

The ratio of the number of equivalents of acid contained by the carboxyl terminated polychloroprene to the number of equivalents of acid or amine contained by the co-curing agent can vary over the range 1:0.05 to 1:10. Preferable ratios are in the range 1:1.15 to 1:1.

The ratio of the number of equivalents of epoxy group present in the epoxy compound to the total number of equivalents of acid plus amine groups present in the carboxyl terminated polychloroprene plus co-curing agent can vary over the range 1:0.25 to 1:3.5. Preferable ratios are in the range 1.05:1 to 1.4:1. the curable composition is formed by mixing the components together at a temperature sufficient to dissolve all the components in the mixture. The temperature required will depend upon the components used but is preferably below 100°C.

When the curable composition has been formed it may then be poured or injected into a mould, the composition being maintained at sufficiently high temperature to keep it fluid. The mould is then heated to sufficient temperature to cure the composition. The choice of the curing time will be determined by the nature of the components used. The components used in the composition should be such that the time and temperature required for mixing them together to give the curable composition is lower than that required to cure the composition. In general temperatures above 100°C preferably about 150°C and times in the range half an hour to 24 hours are preferred.

Apart from this improved cure times, moulding characteristics and good compatability with curing agents, the cured products of the present invention show improved oil resistance and reduced flammability when compared with the products of British Patent Specification No. 957,652.

The present invention is illustrated by the following examples:

EXAMPLES 1 to 7

A series of polymers was prepared by blending chloroprene, a solvent and succinic acid peroxide in the proportions indicated and then warming them in a suitable reactor through the indicated temperature ranges for the indicated times. The polymers were isolated by precipitation from methanol, were washed with methanol and then dried under vacuum at 80°C for several hours. They were analysed with the results indicated in Table 1.

Finally, each product was mixed with 1.3 equivalents of the diglycidyl ether of bisphenol A and 0.5% of 2,4,6-tir(dimethylaminomethyl) phenol and cured for 50 minutes at 155°C to give rubbery products. By way of comparison, a commerical carboxy terminated polybutadiene which is believed to have been prepared according to British Patent Specification No. 957,652 (sold under the trade name HC-434 by Thiokol) was also analysed and cured. In this last case, the cure required 24 hours before a satisfactory product was obtained.

The results obtained are given in the following table in which THF is tetrahydrofuran, $\overline{Mn}$ is number average molecular weight, VPO is vapour pressure osmometry and E.B. is elongation at break.

TABLE 1

| EX. NO. | Solvent g | Succinic Acid Peroxide g | Chloroprene g | Butadiene g | Reaction Temp. °C | Reaction Time mins. | Yield % | $\overline{Mn}$ by VPO |
|---|---|---|---|---|---|---|---|---|
| 1 | THF 40 | 5 | 60 | — | 96–178 | 10 | 50 | 3570 |
| 2 | THF 40 | 5 | 60 | — | 80–95 | 70 | 80 | 7000 |
| 3 | THF 50 | 7.5 | 60 | — | 80–123 | 60 | 75 | 5100 |
| 4 | Methyl ketone 60 | 7.5 | 50 | — | 80–100 | 70 | 77 | 5100 |
| 5 | Methyl ketone 65 | 7.5 | 50 | 5 | 95–101 | 60 | 50 | 4670 |
| 6 | Dioxan 250 | 15 | 100 | — | 84–98 | 55 | 82 | 5390 |
| 7 | Dioxan 250 | Glutaric Acid Peroxide 17.5g | 100 | — | 83–99 | 45 | 87 | 4600 |
| Carboxyl Terminated Polybutadiene HC -434 (Thiokol) | | | | | | | | 4435 |

| EX. NO. | Carboxyl Value m. equiv/g IR | Carboxyl Value m. equiv/g Tit- | Functionality calculated from carboxyl value IR | Functionality calculated from carboxyl value Tit- | Hydroxyl value m.equiv/g by IR | Epoxy Cured Rubber Shore A Hardness | Epoxy Cured Rubber Tensile Strength MN/m² | E.B %|
|---|---|---|---|---|---|---|---|---|

TABLE 1-continued

|   | ration |      | ration |     |      |      |     |     |
|---|--------|------|--------|-----|------|------|-----|-----|
| 1 | 0.5    | 0.46 | 1.8    | 1.7 | 0.5  | 15   | 0.89| 300 |
| 2 | 0.25   | 0.22 | 1.8    | 1.6 | None | 28   | 1.6 | 250 |
| 3 | 0.32   | 0.46 | 1.7    | 2.4 | 1.0  | 33   | 1.1 | 200 |
| 4 | 0.32   | 0.33 | 1.7    | 1.7 | None | 28   | 1.5 | 180 |
| 5 | 0.47   | 0.41 | 2.2    | 1.9 | None | 30   | 1.0 | 190 |
| 6 | 0.32   | 0.33 | 1.7    | 1.8 | None | —    | —   | —   |
| 7 | 0.43   | 0.41 | 2.0    | 1.9 | None | —    | —   | —   |
|   | 0.59   | 0.45 | 2.6    | 2.0 | None | 11   | 0.7 | 500 |

EXAMPLES 8–10

The results of these examples are summarised in Examples 8 and 9. In this case, the solvent, initiator and monomer were charged to the reactor and then rapidly heated to the reaction temperature.

TABLE 2

| EX. NO. | Reactor Charge | | | Catalyst Solution | | Reaction Temp °C | Reaction Time Mins | Yield % | $\bar{M}n$ by VPO | Carboxyl Value | | Functionality | | Variation of $\bar{M}n$ with conversion |
|---|---|---|---|---|---|---|---|---|---|---|---|---|---|---|
| | Solvent g | Chloro- prene g | SAP g | Solvent g | SAP g | | | | | IR | Chemical Analysis | IR | Chemical Analysis | |
| 8 | THF 500 | 500 | — | THF 700 | 75 | 95–97 | 75 | 71 | 7440 | 0.13 | 0.18 | 0.96 | 1.3 | 7170 at 32%<br>8020 at 48%<br>7480 at 55%<br>7440 at 71% |
| 9 | THF 500 | 500 | — | THF 700 | 75 | 95–98 | 65 | 69 | 5270 | 0.32 | 0.29 | 1.7 | 1.5 | Not Known |
| 10 | MEK 1600 | 500 | 75 | — | — | 95–98 | 65 | 61 | 4210 | 0.48 | 0.43 | 2.0 | 1.8 | 4910 at 36%<br>4440 at 49%<br>4260 at 55%<br>4210 at 61% |

MEK Methyethylketone
THF Tetrahydrofuran
SAP Succinic Acid Peroxide

Table 2.

Example 8 was carried out by applying the teaching of British Patent Specification No. 957,652 to the polymerisation of chloroprene and is a comparative example not according to the invention. Solvent (tetrahydrofuran) and monomer (chloroprene) were charged to a reactor and heated to the reaction temperature and then a solution of succinic acid peroxide in tetrahydrofuran was added to the reactor continuously in a decreasing non-linear manner according to the following schedule:

| Time mins | ml added (cont) | Time mins | ml added |
|-----------|-----------------|-----------|----------|
| 0         | 250             | 35        | 680      |
| 5         | 320             | 40        | 715      |
| 10        | 380             | 45        | 750      |
| 15        | 490             | 60        | 800      |
| 20        | 550             |           |          |
| 25        | 590             |           |          |
| 30        | 625             |           |          |

The number average molecular weight of the product changed little with conversion (increasing from 7170 at 32% to 7440 at 71%). However, the functionality of the product was low (between 0.96 and 1.3).

Example 9 was carried out with identical quantities of reagents but in this case when the tetrahydrofuran and chloroprene had been charged to the reactor and heated to the reaction temperature the solution of succinic acid peroxide in tetrahydrofuran was rapidly added to the reactor during two minutes.

Polymer produced by this method had a higher functionality (1.7 to 1.5) and lower molecular weight (5270) than that made as described in Example 8.

Example 10 was run with a large volume of methylethyl ketone as solvent but with the same quantities of chloroprene and succinic acid peroxide as was used in Examples 8 and 9.

Polymer produced from this experiment had a lower molecular weight than those of either examples 8 and 9 and the functionality was 1.8 to 2.0.

The product obtained in Example 10 had a low viscosity which rendered it particularly suitable for liquid rubber applications.

It was noted that the products of the present invention showed a markedly reduced tendency to stick to the mould in the curing process than the comparative product HC-434. In the preparation of the moulding compositions to be cured, it was evident that the HC-434 and the diglycidyl ether of bisphenol A were not completely miscible until heated to about 65°C, whereas the products of the present invention were all miscible with the epoxy compound at room temperature (21°C).

EXAMPLES 11 and 12

The process of examples 1 to 7 was repeated using glutaric acid peroxide (GAP) in place of succinic acid peroxide and dioxan as solvent. The conditions employed are set out in Table 3.

Table 3

| Example | Solvent g | GAP g | Chloroprene g | Temp °C | Reaction Time Min | Yield |
|---------|-----------|-------|---------------|---------|-------------------|-------|
| 11      | 100       | 7     | 40            | 80–97   | 30                | 80    |
| 12      | 250       | 17.5  | 100           | 83–99   | 45                | 87    |

The products of Examples 11 and 12 had respectively molecular weights ($\bar{M}n$) of 4790 and 4600, functionalities from 1R of 1.9 and 2.0 and from titration of 1.74 and 1.90.

EXAMPLES 13 to 24

These are examples of the preparation of curable compositions from carboxy terminated polychloroprene made in accordance with the invention.

Examples 13 to 24 were all carried out with carboxyl terminated polychloroprene that had $\overline{Mn} = 4200$, carboxyl value 0.48 and functionality = 2.0. Methods of mixing, degassing and moulding were as described for Example 13.

EXAMPLE 13

In Example 13 10g of carboxyl terminated polychloroprene (4.8 milli equivalents of acid) was mixed with 1.06g (6.1 milli equivalents) of the diglycidyl ether of bisphenol A and 0.1g of 2,4,6-tri(dimethylaminomethyl) phenol at 80° to 100°C, 2,4,6-tri(-dimethylaminomethyl) phenol is identified in the Table as DMP-30. When the composition was homogeneous it was placed in an oven at 100°C and evacuated to 1mm Hg. for 5 minutes to degas the liquid rubber. The liquid composition was poured into a mould which was then heated under pressure to 155°C for 1 hour.

The cured rubber sheet was allowed to stand at room temperature for 1 week before testing. Shore A hardness was 34, tensile strength at break 1.2 MN/m$^2$ and elongation at break 200%. The conditions used and the results obtained are shown in Table 4.

EXAMPLE 14

Example 14 was carried out in the same way as Example 13 except that 0.28g of 2,4,6-tri(dimethylaminomethyl) phenol was used. Hardness was increased to 44, tensile strength to 2.3 MN/m$^2$ and elongation at break remained at 200%. The conditions used and the results obtained are shown in Table 4.

EXAMPLE 15

In Example 15 10g of carboxyl terminated polychloroprene was mixed with 1.6g (9.2 milli equivalents) of the diglycidyl ether of bisphenol A, 0.28g of 2,4,6-tri(-dimethylaminomethyl) phenol and 0.13g (2.3 milli equivalents) of glutaric anhydride. The composition was degassed and moulded as described in Example 13. Hardness was 51, tensile strength 3.6 MN/m$^2$ and elongation at break 200%. The conditions used and the results obtained are shown in Table 4.

EXAMPLE 16

The conditions used and the results obtained are shown in the Table 4. This Example shows that increased quantities of diepoxide and glutaric anhydride increased the tensile strength of the cured rubber.

EXAMPLE 17

This Example was similar to Example 16 except that a lower level of 2,4,6-tri(dimethylaminomethyl) phenol was used. The conditions used and the results obtained are shown in Table 4. The degree of cure of the rubber was reduced, as was the hardness and tensile strength.

EXAMPLE 18

This Example was carried out as in Example 16 but with maleic anhydride used in place of glutaric anhydride. The conditions used and the results obtained are shown in Table 4. Comparison of Example 18 with Example 16 shows that maleic anhydride gave a rubber with increased hardness and increased tensile strength compared with a rubber prepared using glutaric anhydride.

EXAMPLE 19

This Example was carried out as in Example 15 but with maleic anhydride used in place of glutaric anhydride. The conditions used and the results obtained are shown in Table 4.

EXAMPLE 20

The conditions used and the results obtained are shown in Table 4.

EXAMPLE 21

The conditions used and the results obtained are shown in the Table 4. This Example and Example 20 used relatively small amounts of di-n-butyl-amine. Comparison of these Examples with Example 14 shows that in both cases tensile strength and elongation at break were increased by the secondary amine.

EXAMPLE 22

The conditions used and the results obtained are shown in the Table 4.

EXAMPLE 23 the conditions used and the results obtained are shown in the Table. Comparison of Examples 22 and 23 with Example 14 shows that in Examples 22 and 23 the use of the secondary diamine N,N-disecbutyl-p-phenylene diamine gave increased tensile strength and elongation at break.

TABLE 4

| Example No. | Diglycidyl ether of Bisphenol A | | Co-curing agent g (m equiv) | DMP-30 g | Shore A hardness after standing at 22°C for | | Tensile Strength MN/m$^2$ | Elongation at break % |
|---|---|---|---|---|---|---|---|---|
| | g | m equiv. of epoxy | | | 20 mins | 7 days | | |
| 13 | 1.06 | 6.1 | — | 0.10 | 34 | 34 | 1.2 | 200 |
| 14 | 1.06 | 6.1 | — | 0.28 | 44 | 44 | 2.3 | 200 |
| 15 | 1.60 | 9.2 | Glutaric anhydride 0.13 (2.3) | 0.28 | 50 | 51 | 3.6 | 200 |
| 16 | 2.12 | 12.2 | Glutaric anhydride 0.26 (4.6) | 0.28 | 54 | 54 | 4.7 | 185 |
| 17 | 2.12 | 12.2 | Glutaric anhydride 0.26 (4.6) | 0.10 | 9 | 12.5 | 2.4 | 400 |
| 18 | 2.12 | 12.2 | Maleic anhydride 0.22 (4.5) | 0.28 | 61 | 64 | 6.1 | 130 |
| 19 | 1.60 | 9.2 | Maleic anhydride 0.11 (2.25) | 0.28 | 45 | 47.5 | 3.07 | 190 |
| 20 | 1.48 | 8.5 | Di-n-butylamine 0.137 (1.06) | 0.28 | 50 | 51 | 3.5 | 280 |
| 21 | 1.91 | 11.1 | Di-n-butylamine 0.137 (1.06) | 0.28 | 55 | 58 | 5.0 | 230 |

TABLE 4-continued

| Example No. | Diglycidyl ether of Bisphenol A g | m equiv. of epoxy | Co-curing agent g (m equiv) | DMP-30 g | Shore A hardness after standing at 22°C for 20 mins | 7 days | Tensile Strength MN/m² | Elongation at break % |
|---|---|---|---|---|---|---|---|---|
| 22 | 1.48 | 8.5 | N,N-di-secbutyl-p-phenylene diamine 0.62 (5.6) | 0.28 | 42 | 43 | 4.2 | 340 |
| 23 | 1.91 | 11.1 | N,N-di-secbutyl-p-phenylene diamine 0.62 (5.6) | 0.28 | 51 | 49 | 4.1 | 285 |

I claim:

1. A process for the production of carboxyl terminated polychloroprene which comprises polymerising chloroprene under homogeneous conditions in the presence of a peroxide initiator having two carboxyl terminal groups which form internal anhydrides, the chloroprene being brought into contact initially with substantially all the peroxide initiator employed.

2. A process according to claim 1 wherein the chloroprene is copolymerised with not more than 5% by weight of butadiene.

3. A process according to claim 1 wherein the polymerisation is carried out under homogeneous reaction conditions in the presence of an enert solvent for the ingredients employed.

4. A process according to claim 3 wherein the solvent is a cyclic ether or a ketone.

5. A process according to claim 3 wherein the weight ratio of solvent to chloroprene is in the range 1.2:1 to 15:1.

6. A process according to claim 3 wherein the polymerisation reaction temperature is in the range 70° to 150°C.

7. A process according to claim 6 wherein the polymerisation reaction temperature is in the range 80°C to 120°C.

8. A process according to claim 1 wherein the peroxide initiators are glutaric acid peroxide and succinic acid peroxide.

9. A process according to claim 1 wherein the polymerisation reaction is carried out so as to produce a fluid rubber.

10. A process according to claim 3 wherein the polychloroprene produced is stabilised by rosins and/or rosin acids.

11. A curable composition which comprises a carboxyl terminated polychloroprene having a molecular weight below about 10,000 made in accordance with the process of claim 1, a compound having at least two epoxy groups, a tertiary amine epoxy-curing agent, and a primary or secondary amine or a miscible dicarboxylic acid or anhydride.

12. A curable composition according to claim 11 wherein the carboxyl terminated polychloroprene has a functionality of 1.5 to 2.5.

13. A curable composition according to claim 12 wherein the epoxy compound is a di-functional compound.

14. A composition according to claim 11 wherein the co-curing agent is a mono-amine.

15. A composition according to claim 14 wherein the mono-amine is di-n-butylamine.

16. A composition according to claim 11 wherein the co-curing agent is a secondary amine.

17. A composition according to claim 16 wherein the secondary diamine is an aromatic secondary diamine.

18. A composition according to claim 17 wherein the co-curing agent is N,N-di-sec-butyl-p-phenylene diamine.

19. A composition according to claim 11 wherein the co-curing agent is an acid anhydride having a melting point below 100°C.

20. A composition according to claim 11 wherein the ratio of the number of equivalents of acid contained by the carboxyl terminated polychloroprene to number of equivalents of acid or amine contained by the co-curing agent is in the range 1:0.05 to 1:10.

21. A composition according to claim 20 wherein the ratio is in the range 1:0.15 to 1:2.

22. A composition according to claim 11 wherein the ratio of number of equivalents of epoxy group present in the epoxy compound to the total number of acid plus amine groups present in the carboxyl terminated polychloroprene plus co-curing agent is in the range 1:0.25 to 1:3.5.

23. A composition according to claim 22 wherein the ratio is in the range 1.05:1 to 1.4:1.

* * * * *

UNITED STATES PATENT AND TRADEMARK OFFICE
CERTIFICATE OF CORRECTION

PATENT NO. : 3,969,326
DATED : July 13, 1976
INVENTOR(S) : PETER HENRY WESTERMANN It is certified that error appears in the above-identified patent and that said Letters Patent are hereby corrected as shown below:

Col. 1, line 27, correct the spelling of "peroxide"

Col. 4, line 55, correct the spelling of "terminated"

Col. 5, line 41, first word, capitalize "The"

Col. 6, line 6, after "curing" and before "time", add --temperature and curing-- line 35, after "2,4,6-" correct the spelling of "tri"

Col. 7, Table 1, Ex. No. 1, the first column should read "0.5". The figure "0.46" and all the remaining figures pertaining to Ex. 1 should be moved to the right one column.

Col. 8, line 33, correct the spelling of "examples"

Signed and Sealed this

Twenty-third Day of November 1976

[SEAL]

Attest:

RUTH C. MASON
Attesting Officer

C. MARSHALL DANN
Commissioner of Patents and Trademarks